US011692239B2

United States Patent
Rousseau et al.

(10) Patent No.: US 11,692,239 B2
(45) Date of Patent: Jul. 4, 2023

(54) PROCESS AND SYSTEM FOR PLASMA-INDUCED SELECTIVE EXTRACTION AND RECOVERY OF SPECIES FROM A MATRIX

(71) Applicants: Paris Sciences Et Lettres—Quartier Latin, Paris (FR); Centre National de la Recherche Scientifique (CNRS), Paris (FR)

(72) Inventors: Frédéric Rousseau, Esclavolles-Lurey (FR); Olivier Lesage, Vitry-sur-Seine (FR); Jonathan Cramer, Paris (FR); Frédéric Prima, Paris (FR); Daniel Morvan, Paris (FR)

(73) Assignees: Centre National de la Recherche Scientifique (CNRS); Paris Sciences et Lettres

( * ) Notice: Subject to any disclaimer, the term of this patent is extended or adjusted under 35 U.S.C. 154(b) by 1173 days.

(21) Appl. No.: 16/308,279

(22) PCT Filed: Jun. 8, 2017

(86) PCT No.: PCT/EP2017/064039
§ 371 (c)(1),
(2) Date: Dec. 7, 2018

(87) PCT Pub. No.: WO2017/211994
PCT Pub. Date: Dec. 14, 2017

(65) Prior Publication Data
US 2019/0136341 A1    May 9, 2019

(30) Foreign Application Priority Data
Jun. 10, 2016  (EP) .................................. 16305687

(51) Int. Cl.
*C22B 4/00* (2006.01)
*C22B 4/08* (2006.01)
(Continued)

(52) U.S. Cl.
CPC .............. *C22B 7/004* (2013.01); *C22B 4/005* (2013.01); *C22B 4/08* (2013.01); *C22B 7/001* (2013.01); *C22B 19/30* (2013.01); *Y02P 10/20* (2015.11)

(58) Field of Classification Search
CPC ........... C22B 7/004; C22B 4/005; C22B 4/08; C22B 7/001; C22B 19/30; C22B 7/00;
(Continued)

(56) References Cited

U.S. PATENT DOCUMENTS 4,718,477 A * 1/1988 Camacho ................ C22B 9/226
164/508
4,897,282 A * 1/1990 Kniseley ................. C23C 4/137
427/446

(Continued)

FOREIGN PATENT DOCUMENTS

JP       2007268464 A  * 10/2007
KR       101569710 B1    11/2015
(Continued)

OTHER PUBLICATIONS

Schoeller Harry E, Thermodynamics and Kinetics of Oxidation and Temperature Dependent Mechanical Characterization of Pure Indium Solder, 2005, State University of New York at Binghamton, p. 8, 94 (Year: 2005).*
(Continued)

*Primary Examiner* — Vanessa T. Luk
*Assistant Examiner* — Nikolas Takuya Pullen
(74) *Attorney, Agent, or Firm* — Lerner David LLP (57) ABSTRACT

The invention relates to a process for selectively and continuously extracting a series of desired species from a
(Continued)

matrix, comprising the steps of:—injecting a plasma (310) in an extraction chamber by means of a plasma torch,—continuously monitoring (320) the excited elements extracted from the matrix and contained in the plasma by optical emission spectroscopy, and for each species of the series,—setting a distance (330) between the support and the plasma torch, and the composition of the injected plasma as a function of the monitored excited elements so that only one desired species of the series of species is being extracted from the matrix under molecular form, and—providing (400) a plate in the extraction chamber, exterior to the plasma, causing collection of molecules comprising said desired species by deposition onto the surface of the plate.

14 Claims, 9 Drawing Sheets

(51) Int. Cl.
*C22B 19/30* (2006.01)
*C22B 7/00* (2006.01)

(58) Field of Classification Search
CPC .. C22B 4/00; C22B 19/00; C22B 9/00; C22B 9/226; C22B 7/02; C22B 7/04; C22B 7/009; C22B 4/06; C22B 4/02; C22B 4/04; C22B 11/00; C22B 11/02; C22B 11/021; C22B 11/023; C22B 11/025; C22B 11/026; C22B 11/024; C22B 9/003; C22B 9/01; C22B 9/20; C22B 9/22; C22B 5/00; C22B 5/02; C22B 5/04; C22B 5/06; C22B 5/08; C22B 5/10; C22B 5/12; C22B 5/14; C22B 5/16; C22B 5/18; C22B 13/00; C22B 13/02; C22B 13/025; C22B 15/00; C22B 15/0002; C22B 15/0021; C22B 15/003; C22B 15/0047; C22B 15/005; C22B 15/0052; C22B 15/0056; C22B 7/005; Y02P 10/20; C23C 16/0245; C23C 16/276; C23C 16/277; C23C 16/45536; C23C 16/45538; C23C 16/4554; C23C 16/455; C23C 16/42; C23C 16/50; C23C 16/513

See application file for complete search history.

(56) References Cited

U.S. PATENT DOCUMENTS

| | | | | |
|---|---|---|---|---|
| 5,125,963 | A | * | 6/1992 | Alden ............... H01J 37/32935 75/696 |
| 5,548,611 | A | * | 8/1996 | Cusick ................. B09B 3/0066 432/13 |
| 5,736,073 | A | * | 4/1998 | Wadley ..................... B22F 9/12 264/10 |
| 5,750,822 | A | * | 5/1998 | Gotovchikov .......... G21F 9/305 588/11 |
| 6,388,226 | B1 | * | 5/2002 | Smith ............... H01J 37/32009 219/121.57 |
| 2003/0143318 | A1 | * | 7/2003 | Schutte ..................... C23C 4/12 427/446 |

FOREIGN PATENT DOCUMENTS

| | | | |
|---|---|---|---|
| WO | WO-0243905 A2 | * 6/2002 | ........... B22F 1/0051 |
| WO | 2015088494 A1 | 6/2015 | |

OTHER PUBLICATIONS

EMI/RFI Filter Basics, Genisco Filters, Jun. 8, 2014 (Year: 2014).*
Tomsic, Joan L. Directory of Materials and Testing, 2000, SAE International, p. 160 (Year: 2000).*
Schaschke, Carl. (2014). Dictionary of Chemical Engineering—PFD. Oxford University Press, p. 273 (Year: 2014).*
A. Kolpaková, P. Kudrna, and M. Tichý, Study of Plasma System by OES (Optical Emission Spectroscopy), 2011, Charles University Prague, Faculty of Mathematics and Physics, p. 180, 185 (Year: 2011).*
Gomez, et al., "Thermal Plasma Technology for the Treatment of Wastes: A Critical Review", Journal of Hazardous Materials, vol. 161, No. 2-3, Jan. 2009, pp. 614-626.
Extended European Search Report for EP Application No. 16305687, dated Nov. 11, 2016.
International Search Report for PCT/EP2017/064039, dated Sep. 1, 2017.

* cited by examiner

PROCESS AND SYSTEM FOR PLASMA-INDUCED SELECTIVE EXTRACTION AND RECOVERY OF SPECIES FROM A MATRIX

CROSS-REFERENCE TO RELATED APPLICATIONS

The present application is a national phase entry under 35 U.S.C. § 371 of International Application No. PCT/EP2017/064039, filed Jun. 8, 2017, which claims priority from European Patent Application No. 16305687.2, filed Jun. 10, 2016, all of which are incorporated herein by reference.

TECHNICAL FIELD OF THE INVENTION

The invention relates to a process and system for selective and continuous extraction of species from a piece of material, hereinafter called a matrix. The invention in particular applies to recovery of metallic species from electronic waste.

BACKGROUND ART

The modern consumption society has triggered an increase in production and consumption of electronic devices such as laptops, phones, computers, etc. These devices are usually quickly replaced by consumers who desire state-of-the-art designs and functionalities. As a result, increasing amounts of broken or still working devices are discarded and form so-called electronic waste.

Electronic waste comprises important amounts of materials such as polymers, resin, metals, or mineral products that could be recovered in order to be recycled.

An important issue with recycling electronic waste is that of extracting metals from complex alloys comprising a lot of elements such as Fe, Co, Cr, Cu, Ti, Zn, etc.

Some technologies such as hydrometallurgy or pyrometallurgy have already been proposed for extracting desired species from a matrix. These technologies must be implemented after a pyrolysis step to ensure that the waste no longer comprises resins or organic compounds.

Hydrometallurgy is generally used to extract aluminum, zinc or copper from a matrix. It comprises a series of chemical operations, among which a solutionization of the matrix, for instance by lixiviation, to extract, in a solution, metallic species as well as impurities, followed by a step of purification of the thus obtained solution and a step of extraction of metal from the purified solution, for instance by electrolysis, precipitation, electrolysis, etc.

In the past, hydrometallurgy has been applied to the extraction and purification of metal from natural ore.

The application of hydrometallurgy to the recycling of electronic waste has a number of drawbacks.

First, a plant performing hydrometallurgy is generally designed according to the composition of the matrix that is processed in the plant, because the series of steps that are implemented in the process and the composition of the solutions that are used during these steps are very specific to this composition. Therefore, a slightest change in the composition of the base matrix can alter the functioning and the efficiency of the plant.

This technology is therefore not adapted to the processing of electronic waste in which the composition of the alloys can be highly variable, for instance depending on the area and nature of the equipment to be recycled.

Pyrometallurgy is a thermal process comprising a series of step including at least a thermal processing of the matric at a high temperature to homogenize the metal to be extracted in the matrix, a chemical treatment to separate the metal from the matrix, and a purification of the metal.

This technology may be more easily adaptable to the composition of the matrix. It is however highly energy-consuming, and additionally it may not guarantee a constant and high purity of the extracted metal.

There is therefore a need for a technology that is suitable for recovery of metals from electronic waste.

SUMMARY OF THE INVENTION

One aim of the invention is to overcome the aforementioned disadvantages of the prior art by providing a process and system that is suitable for extraction of metals from matrices of variable composition.

Another aim of the invention is to be applicable to the extraction of species from metallic waste, natural ores, glass, mirrors, etc.

Another aim of the invention is to provide an adaptive process for easily extracting a wide variety of metallic species.

Another aim of the invention is to allow collection of pure metallic species.

To this end, a process for selectively and continuously extracting a series of species from a matrix is disclosed, comprising the steps of:
 injecting a plasma in an extraction chamber by means of a plasma torch, the matrix being disposed on a support within the extraction chamber, said plasma causing:
  formation of molecules, at the surface of the matrix, from chemical elements contained in the matrix and in the plasma,
  evaporation of said molecules from the matrix,
  destruction of some molecules and excitation of chemical elements contained in the molecules and extracted from the matrix,
 continuously monitoring the excited elements extracted from the matrix and contained in the plasma by optical emission spectroscopy, and
for each species of the series,
 setting a distance between the support and the plasma torch, and the composition of the injected plasma as a function of the monitored excited elements so that only one desired species of the series of species is being extracted from the matrix under molecular form, and
 providing a plate in the extraction chamber, exterior to the plasma, causing:
  reformation of said molecules previously destroyed by the plasma comprising the desired species extracted from the matrix,
  collection of said molecules comprising said desired species by deposition onto the surface of the plate.

In some embodiments, the process may comprise at least one of the following features:
 the step of adjusting the distance between the support and the plasma torch is performed by moving the support relative to the plasma torch.
 the step of adjusting the composition of the injected plasma comprises selectively mixing, to a plasma-producing gas, at least one additive gas selected among the group consisting of oxygen, hydrogen, nitrogen, ammonia gas, chlorine, fluorine, carbon dioxide and their derivatives including nitrates and hydrocarbines.

The process further comprises a step of setting the matrix at a determined potential related to the plasma and adjusting the said potential according to the monitored excited elements.

The process further comprises a step of adjusting respective flows of a plasma-producing gas and an additional gas composing the injected plasma, in order to adjust the partial pressure of the additional gas inside the extraction chamber, according to the monitored excited elements.

The process comprises a preliminary step of pyrolysis of the matrix with the injected plasma.

The process further comprises a step of injecting a plasma in the extraction chamber and monitoring the injected plasma by optical emission spectroscopy to detect stabilization of the plasma, said preliminary step being followed by a step of introducing the matrix in the extraction chamber or bringing the matrix closer to the plasma torch.

a plasma-producing gas feeding the plasma torch is argon, and detecting the stabilization of the plasma comprises detecting a stabilization of the amount of argon in the plasma by optical emission spectroscopy.

The process further comprises setting a collection plate at a determined potential according to the species to collect in order to enhance deposition of said molecules on the collection plate.

each of the extracted species is any metallic species.

the matrix is fed continuously under powder form or sequentially as a batch.

According to an embodiment, a recycling process is disclosed, comprising extracting a series of metallic species from a piece of electronic waste by implementation of the process according to the above description.

According to an embodiment, a system for selective extraction of species from a matrix, comprising:
an extraction chamber,
a support located within the extraction chamber,
a plasma torch comprising a supply of plasma-producing gas, a supply of at least one additive gas, and a gas mixing device, the plasma torch being adapted for generating a plasma directed towards the support, and
an optical emission spectroscopy apparatus, adapted to continuously monitor excited elements contained within the extraction chamber,
wherein the support is movable with respect to the plasma torch in order to change a distance between the support and the plasma torch during the injection of the plasma.

In some embodiments, the system can further comprise at least one of the following features:
the system further comprises a control unit adapted to adjust the distance between the support and the plasma torch, and/or the composition of the injected plasma according to the monitored excited elements.
The system further comprises a power source adapted to set a matrix disposed on the support at a determined potential, and a RF filter interposed between the power source and the matrix.

The process according to the invention allows extracting any kind of metallic species, including rare earths, from matrices of any composition, because the adjusting of the distance between the matrix and the plasma torch—and hence the temperature at the surface of the matrix—and the composition of the plasma can be selected to allow extraction of any desired species.

Moreover, the real time monitoring, by optical emission spectroscopy, of the species being extracted from the matrix, allows a real-time adjustment of the above parameters. The process is therefore highly reactive and adaptable to the species that is to be extracted.

This monitoring also guarantees that the extraction of species is selective because one can easily detect whether additional unwanted species are being extracted, and adjust the parameters accordingly. This in turn ensures that only the desired species are present in the plasma and thus only them can deposit on the collection plate.

A high degree of purity of the metal deposited on the collection plate can thus be achieved.

Last, a series of desired species can be sequentially extracted and recover from a same matrix during a single process. This allows recovering all the interesting species that are contained in a matrix of a potentially complex composition, at a low cost because it only needs adjusting the parameters of the extraction without redesigning the system implementing the process.

BRIEF DESCRIPTION OF THE DRAWINGS

The features and advantages of the invention will be apparent from the following more detailed description of certain embodiments of the invention and as illustrated in the accompanying drawings, in which.

DETAILED DESCRIPTION OF A PREFERRED EMBODIMENT OF THE INVENTION

System for Extracting Species From a Matrix

Figure 1:
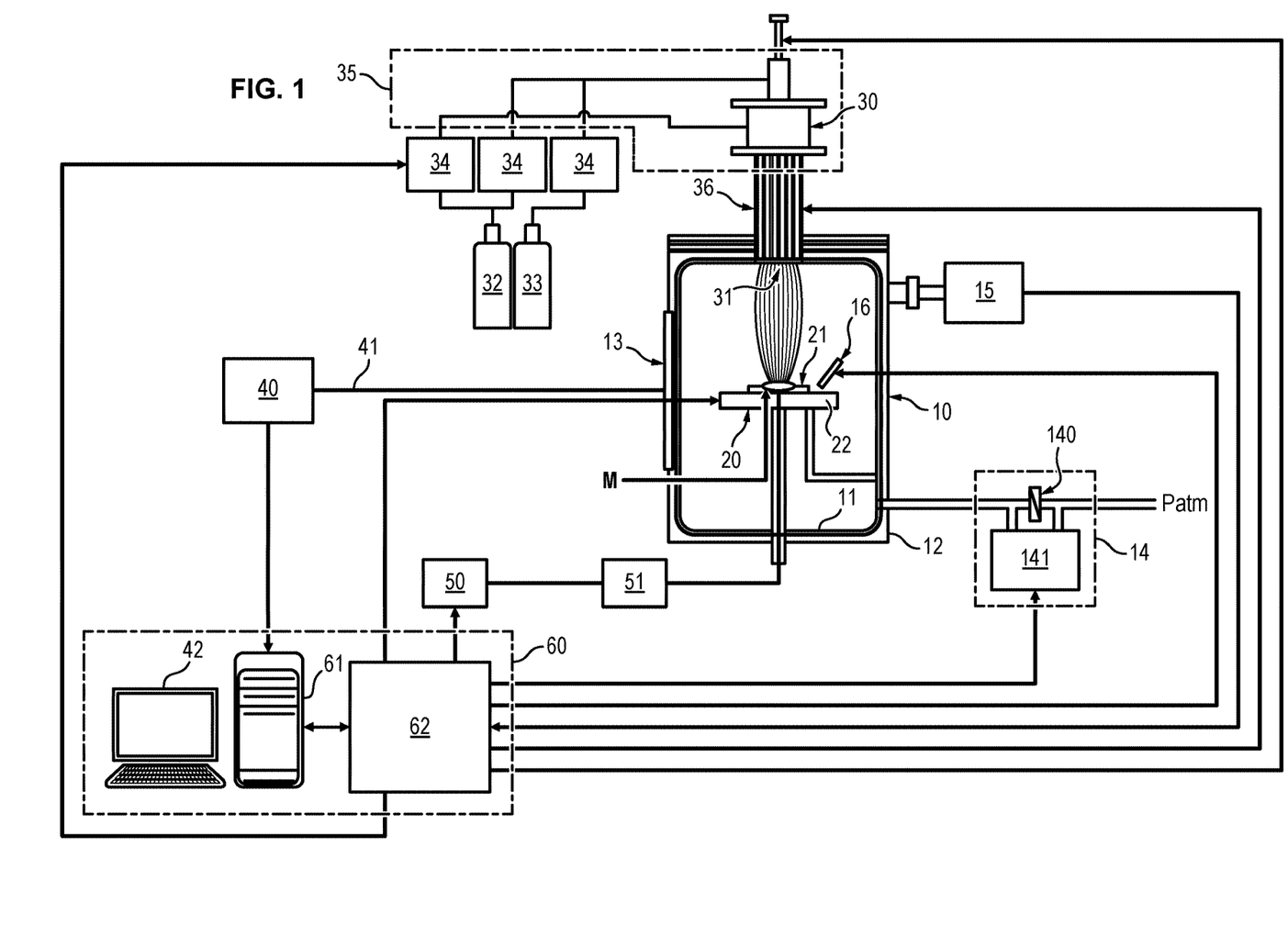
FIG. 1 schematically shows a system for selective extraction of species.

With reference to FIG. 1, a system 1 for extracting species from a matrix is disclosed. By species is meant a chemical element in any form thereof, for instance in pure atomic form or in molecular form such as an oxide.

The species to be extracted are metallic species, including rare earths, such as, but not limited to, iron Fe, copper Cu, tin Sn, aluminium Al, silicon Si, gold Au, silver Ag, Indium In, lithium Li, Neodymium Nd, etc.

The matrix is preferably a piece of electronic waste such as a part extracted from an electronic device, for instance a mobile phone, a computer, an audio player, etc. It can also be a piece of natural ore, a piece of glass, of mirror, etc.

The system 1 comprises an extraction chamber 10. This chamber 10 preferably comprises a first compartment 11 made of stainless steel, delimiting an internal volume of the extraction chamber, and a second compartment 12 surrounding the first, and also made of stainless steel. The extraction chamber 10 is water-cooled by circulation of water between the compartments 11 and 12.

The extraction chamber 10 comprises at least one analysis window 13 allowing one to see the inside of the chamber from the outside, through the first and second compartments 11, 12.

The pressure inside the internal volume of the extraction chamber 10 is controlled by means of a pressure regulation device 14, which comprises a valve 140 and a pump 141 for connecting the internal volume of the extraction chamber 10 and the atmosphere and controlling a flow of gases exiting the extraction chamber 10. A manometer 15 may be provided to monitor the pressure inside the internal volume of the extraction chamber.

Within the extraction chamber 10 is provided at least one collection plate 16, which is positioned in order to collect species extracted from the matrix. Each collection plate 16 is preferably movable in three directions within the extraction chamber 10 so that it can be put at a proper position for the collection of species. The material forming the collection plate 16 may vary in accordance to the type of species to collect, to enhance the deposition of the species on the plate.

For instance the collection plate 16 can be made of alumina or silicon. An alumina plate is suitable for instance for collection of copper. A silicon plate is suitable for collection of Tin.

The system 1 also comprises a support 20 for holding a matrix M within the extraction chamber. The support 20 is positioned within the extraction chamber. Preferably, the support 20 includes a crucible 21, that is to say a container able to withstand important heat, and comprising a concave recess which allows containing the matrix even if it melts. The crucible is preferably made of graphite.

The support 20 also includes a support plate 22 on which the crucible is positioned. Said plate is held horizontally. It is also water-cooled.

The support 20 is movable in translation inside the extraction chamber. To this end the support plate 20 may be a robotic table which is controlled electronically.

The system 1 further comprises a plasma torch 30, which is adapted to generate a plasma within the extraction chamber, said plasma being directed towards the support. The plasma torch 30 is of the thermal plasma type, which is to say that the temperature of the generated plasma ranges between about 1000 and about 10000 K, and can even exceed 10000 in the core of the plasma.

Preferably, the plasma torch 30 comprises a plasma-exiting aperture 31 through which plasma is projected towards the support 20, said aperture being located above the support 20 so that the direction of the plasma generated by the torch is generally a vertical downward direction.

Moreover, the motion of the support 20 relative to the plasma torch 30 is designed to allow bringing the matrix closer to or further from the plasma torch to respectively increase or decrease the temperature of the torch. Thus the motion of the support is preferably a vertical motion.

The plasma torch 30 comprises a supply 32 of a plasma-producing gas, for instance including a tank in which the gas is stored, under compressed gas or liquid form, and an expander (not shown) for providing a flow of gas from the tank. This gas is preferably Argon. It could also be other gases such as helium, nitrogen, air, krypton, etc. However, plasma produced out of these gases produces a lot of light and can trouble an operator of the system, therefore argon is preferred to these alternatives.

Additionally, the plasma torch 30 comprises a supply 33 of at least one additional gas to be mixed with the plasma-producing gas in order to enter into the composition of the plasma injected inside the extraction chamber 10. The supply 33 can comprise one tank in which each additional gas is stored, and an expander (not shown).

The additional gas can be of various types, according to the nature of the species to be extracted from the matrix, as is explained in further details below. The additional gas can for instance be oxygen (under the form of dioxygen) $O_2$, hydrogen (under the form of dihydrogen) $H_2$, nitrogen (under the form of dinitrogen) $N_2$, ammonia gas $NH_3$, chlorine $Cl_2$, fluorine $F_2$, carbon dioxide $CO_2$ and their derivatives including nitrates and hydrocarbines.

The plasma torch further includes a gas mixing device 35, comprising at least one gas-feeding duct, having inputs connected to each of the supply 32 of plasma-producing gas and the supply 33 of additional gas, and an output injecting the gases in a plasma generating chamber 36 of the plasma torch. Flowmeters 34 are provided for monitoring the respective flows of the plasma producing gas and the additional gas in order to be able to monitor the composition of the plasma obtained by the mixing of the two. Preferably the flowmeters 34 are adapted to monitor the mass flow of each gas.

The plasma generating chamber 36 is the place where the gas is excited and/or ionized into a plasma, the plasma exiting said chamber through the above-mentioned plasma-exiting aperture 31.

The structure of the plasma generating chamber 36 depends upon the type of plasma torch to be used. In an embodiment, the torch is a plasma capacitive torch. The plasma generating chamber 36 then comprises a cathode connected to the ground, and which is surrounded by mixed gas supplied by the gas mixing device. The cathode is preferably water-cooled and made of copper. A device for circulating water for the cooling of the cathode, the support 20 and the extraction chamber is provided, although not shown.

In the plasma generating chamber 36, the path of gas is itself surrounded by an anode which, together with the cathode, generates electric field to excite or ionize the gas and form the plasma out of the mixed gas. To this end the anode is connected to an RF generator.

In another embodiment, the torch can be a microwave plasma torch, and the excitation/ionization of gas is achieved by a microwave generator. In still another embodiment, the torch is of inductive type, and inductive coils connected to an RF generator are used to excite/ionize the gas from an electromagnetic field.

In still another embodiment, the torch is of DC type, comprising separated but closed cathode and anode connected to an electrical DC generator. The arc generated between the two electrodes is used to excite/ionize the plasma.

Some additional plasma-producing gas can be injected against the walls of the plasma generating chamber 36 to create a sheath which protects the walls from the high temperature of the plasma.

In any case, the plasma torch is preferably adapted to generate a power discharge comprised between 10 and 30 kW.

The system 1 further comprises an optical emission spectroscopy apparatus 40, which is adapted to continuously and in real time monitor the composition of the plasma within the extraction chamber 10. To this end, the apparatus 40 is coupled to the extraction chamber 10 by means of an optical fibre 41, which collects light emitted by the plasma through the analysis window 13.

As known by the skilled person, the optical emission spectroscopy apparatus can detect photons issued by atoms during a transition phase from an excited state to a non-excited state. The energy of the issued photon depends on the type of atom from which it results. Therefore, the monitoring of the emission lines of excited atoms within the extraction chamber 10 by the optical emission spectroscopy apparatus 40 allows discriminating the type of atoms producing the lines, and in turn monitoring the content of the extraction chamber.

The composition of the plasma monitored by the optical emission spectroscopy apparatus 40 is preferably displayed on a display 42 such as a screen.

Preferably, the system 1 also comprises a power source 50, being a current or voltage generator, adapted to set the support 20 of the matrix at a determined voltage in order to control a voltage difference between the plasma and the support 20. This generator 50 is advantageously coupled to an RF filter 51 which protects the generator 50 from the radiofrequencies generated by the plasma torch 30, if the plasma torch is an arc plasma torch or an inductive plasma torch.

Last, the system 1 comprises a control unit 60. The control unit 60 comprises a calculator 61 such as for instance a processor, a microprocessor, a controller, etc, and at least one interface 62 adapted to link the control unit 60 to the various other components of the system.

The calculator 61 is preferably able to control the position of the matrix support 20 relative to the torch and receive a feedback about said position, via said interface 62. The calculator 61 is also able to control the plasma torch 30 and in particular the composition of the gas entering the plasma-generating chamber 36 in order to control the composition of the plasma. To this end, the calculator 61 receives via the interface 62 the values of flows of plasma-generating gas and each additional gas injected into the plasma generating chamber 36 to generate the plasma. The calculator 61 is also able to control respective pump for modulating the flow of each gas.

The calculator 61 is also able to control the current or voltage generator 50 via the interface 62, in order to be able to control the voltage potential between the plasma and the matrix support 20.

The calculator 61 is also able to receive, via the interface 62, values monitored by the manometer 15 and to control the pressure-regulation device 14. It is also able to control the position of the collection plate.

The calculator 61 may also be able to control, via the interface 62, the introduction of matrix inside the extraction chamber, preferably when the matrix is introduced in powder form coaxially with the flow of gases.

As explained in more details below, the composition of the plasma that is detected by the optical emission apparatus 40 is used to adjust a number of parameters in order to extract and collect only desired species from the matrix.

To do so, in an embodiment, the calculator 61 may be coupled to the optical emission spectroscopy apparatus, so that the instructions given by the calculator 61 to the various components of the system in order to adjust said parameters may be servo-controlled in accordance with the data provided by the optical emission spectroscopy apparatus 40.

In another embodiment, the parameters may be controlled through the control unit by an operator, in accordance with displayed data provided by the optical emission spectroscopy apparatus 40.

The control unit 60 can comprise a display, such as the one 42 displaying the results of the optical emission spectroscopy apparatus.

Species Extraction Process

Figure 2:
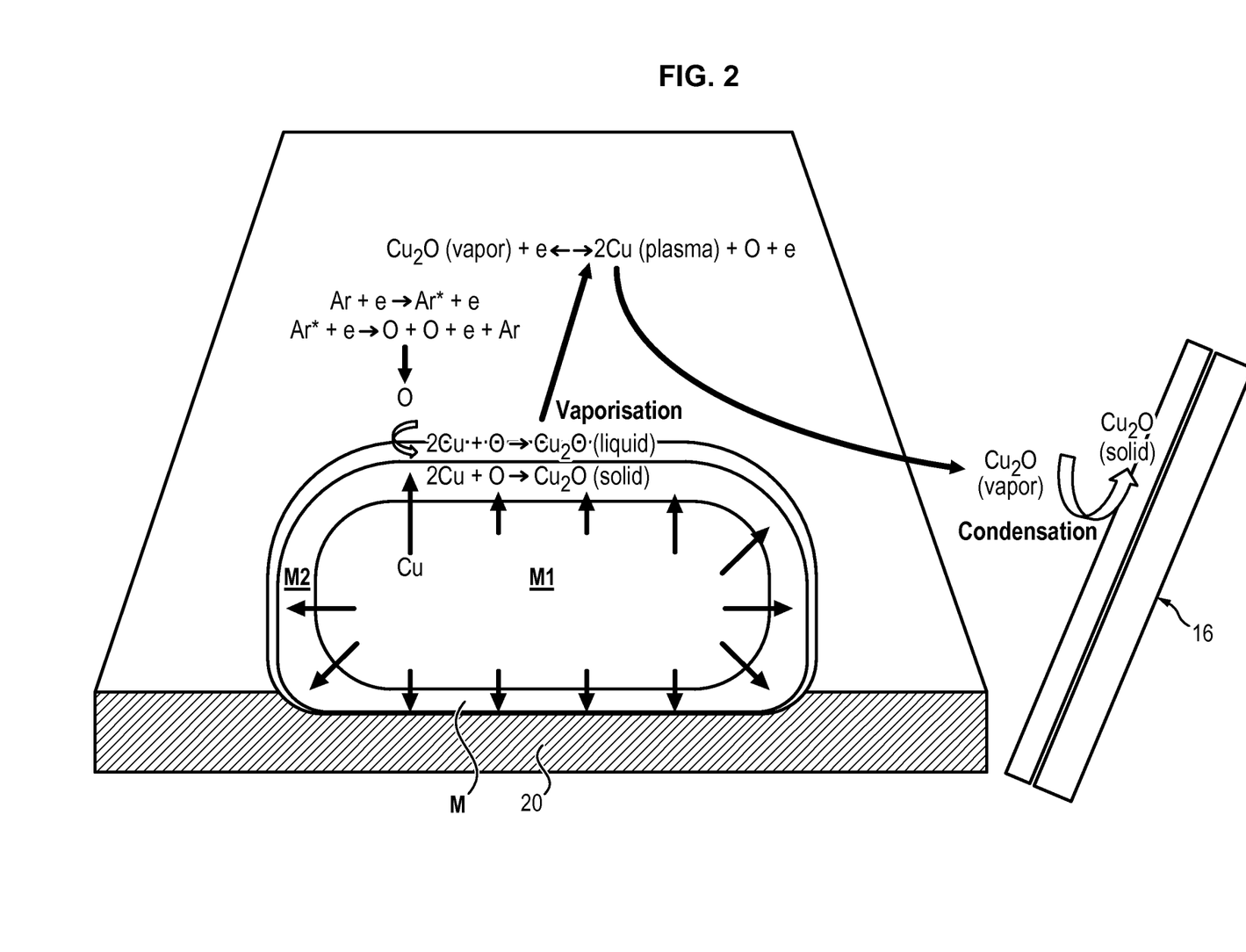
FIG. 2 schematically shows the chemical phenomena occurring during an extraction process.
Figure 3:
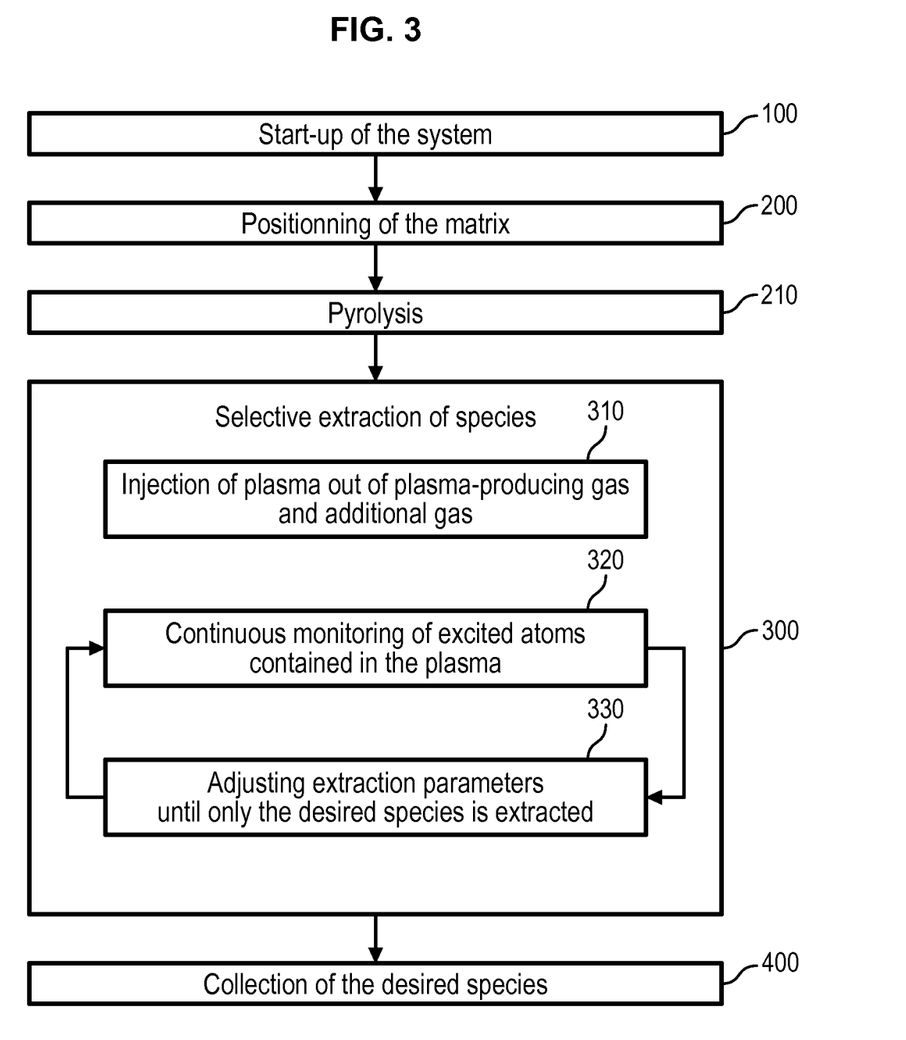
FIG. 3 shows the main steps of an extraction process according to one embodiment of the invention.

With reference to FIGS. 2 and 3, a process for the extraction of species from a matrix will be described.

The process may comprise a preliminary step 100 of start-up of the system 1. During this step 100, either no matrix is placed within the extraction chamber 10, or it is placed on the support 20 at a maximum distance from the plasma torch.

The start-up step 100 comprises decreasing the pressure in the extraction chamber 10 by the pressure regulation device 14 until a pressure equal to 1000 Pa or below is reached.

Then, the step 100 comprises generating a plasma within the extraction chamber, by starting the plasma torch and injecting into the plasma-generating chamber 36 a flow of plasma-producing gas only, said gas being ionized to produce a plasma. For instance, a flow of argon of about 10 L/min can be injected into the plasma torch, and initially forms a cold plasma.

The power of the plasma torch and the flow of plasma producing gas are progressively increased until a thermal plasma is obtained. This in turn causes a progressive rise in temperature and pressure within the extraction chamber 10.

The start-up step 100 preferably also comprises continuously monitoring the plasma injected inside the reaction chamber 10 by optical emission spectroscopy. During this step, the only species that the optical emission spectroscopy is able to detect is that of the plasma producing gas, because it is the only species that is injected inside the chamber. The monitoring allows detecting a transition time of the plasma from a cold to a thermal plasma, and then a stabilization of the thermal plasma which is observed by the stabilization of the intensity of the emission line of the species composing the plasma producing gas—typically argon.

Figure 6:
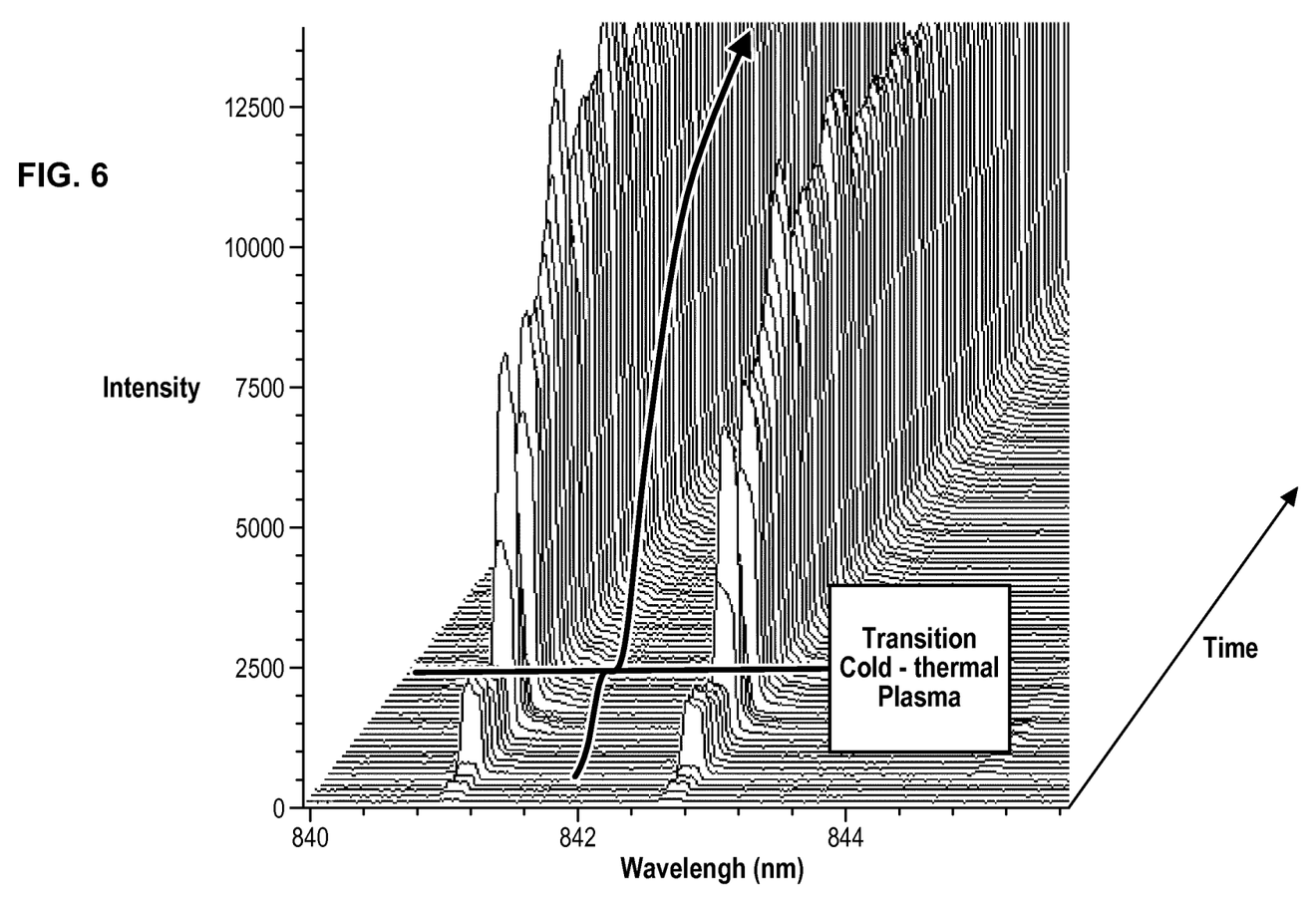
FIG. 6 shows an analysis by optical emission spectroscopy of the start-up of the process.

For instance, FIG. 6 shows an example of the evolution, over time, of the intensity of the emission lines of argon as plasma producing gas during a start-up of the system. FIG. 6 displays a sudden increase in the emission lines of argon, which corresponds to a time of transition between a time at which the plasma is a cold plasma to a time at which it is a thermal plasma. This sudden increase is followed by a stabilization of the intensity of the emission lines.

Once the stabilization is detected, the plasma torch has reached a stable phase and the system can be used for the selective extraction of species from a matrix as detailed below.

Prior to this, the pressure regulation device 14 decreases the pressure within the extraction chamber 10 until it reaches atmospheric pressure. All the next steps are performed at atmospheric pressure, therefore there is a continuous flow of gas from the inside of the extraction chamber 10 towards the outside through the pressure regulation device.

Moreover, prior to implementing the next steps of the process, the power of the plasma torch and the flow of plasma-producing gas are preferably adjusted. For instance the stabilized power of the torch can be about 20 kW and the flow of plasma producing gas about 70 L/min.

Then a matrix is positioned on the support 20 inside the extraction chamber 10 during a step 200, or the matrix already positioned on the support 20 is brought closer to the plasma torch to make its temperature raise and initiate its melting 200.

The matrix can be fed in the extraction chamber continuously under powder form. In that case it is preferably injected through the plasma torch 30, coaxially to the flow of plasma-producing and/or additional gas, in order to fall on the support 20. In that case the matrix is preferably fed only when the start-up phase 100 is terminated.

Alternatively, the matrix can be fed sequentially by batches provided on the support 20, each batch weighing approximately from 5 to 100 g. In that case the matrix can be initially positioned on the support 20 before the start-up phase 100 is implemented, and then the support 20 is brought closer to the plasma torch 30.

Optionally, the process can then comprise a step 210 of pyrolysis of the matrix. This step can be achieved by heating the matrix with the plasma made out of only the plasma producing gas. The heating temperature of the matrix is determined according to the distance between the matrix and the plasma torch 30. A pyrolysis temperature is for instance comprised between 200° C. and 3000° C., depending on the type of the matrix and organic compounds to destroy.

Alternatively, an additional gas can be used to form the injected plasma, comprising species that can react with carbon atoms contained in the matrix in order to extract said carbon atoms. The additional gas can for instance be oxygen or hydrogen.

The heat caused by the plasma and the presence of oxygen or hydrogen atoms in the plasma fosters extraction of carbon atoms from the matrix, as the atoms of the plasma react with carbon to form hydrocarbons or carbon oxides (see description below with reference to FIG. 2 of the chemical reactions occurring between the matrix and the plasma).

In that case, the pyrolysis step 210 preferably also comprises a continuous monitoring of the composition of the atmosphere within the extraction chamber by optical emission spectroscopy. This allows monitoring extraction of carbon from the matrix. As the content of the extraction chamber progressively flows toward the outside of the chamber though the pressure regulation device, carbon monitored by optical emission spectroscopy corresponds to the carbon being extracted from the matrix. Therefore, the pyrolysis step is pursued until no carbon is being extracted from the matrix, i.e. when no emission line from the carbon is visible any longer by OES.

This embodiment of the pyrolysis step allows detecting with certainty the moment from which the matrix no longer comprises organic compounds. The duration of the pyrolysis step can thus be reduced.

The process then comprises a step 300 of selective extraction of a desired species from the matrix. This step first comprises injecting 310 a plasma inside the extraction chamber 10, wherein the plasma is obtained by excitation and/or ionization, by the plasma torch 30, of a mix of plasma-producing gas and at least one additional gas.

The additional gas is selected in accordance with the species to extract from the matrix, as will be described more in details below.

As is shown in FIG. 2, the injection of plasma inside the reaction chamber, where the matrix is positioned, can cause, under specific conditions of temperature and composition of the plasma, a series of chemical reactions which leads to extraction of the desired species.

In the non-limiting example of FIG. 2, copper is extracted from a matrix made of iron and copper, by a plasma made out of argon as plasma-producing gas and oxygen as additional gas.

First, the heat caused by the thermal plasma neighbouring the matrix causes at least part of the matrix to melt. On FIG. 2, the matrix comprises a first, unmolten zone M1 at its core, and a second molten zone M2 surrounding the first.

According to the temperature at the interface between the plasma and the matrix, which depends on the distance of the matrix relative to the plasma torch, the partial melting of the matrix causes diffusion of the species to be extracted towards the surface of the matrix. A concentration gradient of the desired species appears from the surface to the core of the matrix, and the species to be extracted accumulates at the surface of the matrix. In the example of FIG. 2, said species is copper.

Meanwhile, the injection of plasma producing gas and additional gas to generate the plasma inside the extraction chamber 10 causes creation within the extraction chamber 10 of an atmosphere composed of chemical elements which originate from the plasma producing gas and additional gas, under various chemical forms. These forms include ionized elements, excited atoms, and molecules made from the components of the plasma producing gas and the additional gas. Collisions between free electrons and molecules result in the presence of atoms, which originate from the plasma producing gas and the additional gas.

In particular, the atmosphere includes atoms of chemical elements, which were contained initially in the additional gas, these atoms being able to react with the species to be extracted from the matrix. For instance, in the example of FIG. 2, the additional gas is dioxygen, and some dioxygen molecules are broken down in the plasma into oxygen atoms. The additional gas is selected in accordance with the species to be extracted from the matrix to ensure that atoms from this gas are present within the plasma, and that these atoms can react with the species to be extracted from the matrix.

The species to be extracted from the matrix, concentrated at the surface of the matrix, reacts with atoms contained in the plasma to form molecules. These molecules then evaporate from the matrix under adequate conditions of temperature and pressure within the extraction chamber. The plasma thus causes the establishment of a vapor-liquid equilibrium at the plasma interface.

In the example shown in FIG. 2, the copper concentrated at the surface of the matrix reacts with oxygen originating from the additional gas to form $Cu_2O$ molecules which then evaporates inside the plasma.

The evaporated molecules made from chemical elements initially contained in the matrix and in the additional gas then react within the plasma. In particular, some molecules are continuously broken down into atoms by free electrons or excited argons or other atoms originating from the plasma-producing gas, and reformed afterwards. For example, some $Cu_2O$ molecules break down into Cu and O atoms. Some of the atoms resulting from the breaking down of the molecules get excited within the plasma and emit emission lines upon transition from an excited state to a non-excited state, said emission lines being detectable by optical emission spectroscopy.

Therefore, the step 300 of selective extraction of species comprises a continuous monitoring 320 of excited atoms comprised in the plasma by optical emission spectroscopy, in order to monitor the species which are currently being extracted from the matrix.

Step 300 of selective extraction further comprises, while performing this continuous monitoring, adjusting 330 a series of parameters until only the desired species is being extracted from the matrix—this being confirmed by optical emission spectroscopy only showing emission lines of the desired species within the extraction chamber.

The main parameters adjusted during step 300 are the composition of the plasma injected inside the extraction chamber 10 and the distance between the matrix and the support.

Preferably, but optionally, other parameters can be selectively adjusted such as the respective partial pressures of the plasma producing gas and the additional gas to form the plasma, and the potential difference between the plasma and the matrix.

Of course, plasma is still injecting while steps 320 and 330 are performed.

Composition of the Plasma

As introduced above, the species to be extracted from the matrix react with atoms contained in the plasma and originating from the additional gas injected with the plasma producing gas to produce the plasma.

Thus the additional gas injected during step 300 is selected in order to comprise chemical elements, which can react with the species to be extracted in order to form molecules, which can evaporate from the matrix.

Examples of additional gases that can be used were given above.

For instance, to extract copper, tin, iron or silicon, dioxygen may be used as additional gas in order to form respectively $Cu_2O$ molecules, $SnO_2$, $Fe_2O_3$ molecules or $SiO_2$ molecules.

As another example, in order to extract Al or Zn, hydrogen may be used as additional gas in order to form respectively $AlH_3$ or $ZnH_2$ molecules.

As another example, in order to extract Ti, Pt, Pd or Au, $Cl_2$ may be used as additional gas in order to form respectively $TiCl_4$, $PtCl_2$, $PdCl_2$ or $AuCl_3$ molecules.

Distance Between the Matrix and the Plasma Torch

During step 300, the distance between the matrix positioned on the holder 20 and the plasma torch 30 is tuned in order to adjust the temperature at the interface between the matrix and the plasma. The closer the matrix gets to the plasma torch, the higher the temperature.

The temperature at the interface is selected in accordance with the desired chemical species to extract, and in particular with:
- the melting temperature of a material made of the pure chemical species, because it allows selecting the chemical species which diffuses within the matrix and concentrates at the surface of the matrix to react with the atoms contained in the plasma, and
- the boiling temperature of molecules formed out of the chemical species present inside the matrix and inside the plasma, because it allows controlling which chemical species evaporates from the matrix.

Back to the example of FIG. 2, the matrix is formed of iron and copper. Table 1 below shows the respective melting and boiling temperatures of the following compounds: pure Fe, pure Cu, CuO, $Cu_2O$, FeO and $Fe_2O_3$.

TABLE 1

| | Melting temperature (° C.) | Boiling temperature (° C.) |
|---|---|---|
| Cu | 1083 | 2300 |
| CuO | 1326 | 2000 |
| $Cu_2O$ | 1235 | 1800 |
| Fe | 1538 | 2862 |
| FeO | 1420 | 3414 |
| $Fe_2O_3$ | 1560 | 1987 |

Thus one can see that by adjusting a temperature at the interface between the matrix and the plasma between about 1800° C. and about 1950° C. it is possible to extract only copper from the matrix under the form of $Cu_2O$, while maintaining iron inside the matrix.

Partial Pressure of the Additional Gas

The respective flows of plasma producing gas and additional gas are preferably controlled in order to adjust the respective partial pressures of each gas within the extraction chamber 10.

In particular, the presence in the plasma of chemical elements originating from the additional gas not only allows extraction of the desired species from the matrix, but adjusting the amount of said chemical elements through the partial pressure of the additional gas also allows adjusting the selectivity of the process. Indeed, partial pressure modulation allows increasing the volatility of some of the species contained in the matrix, and enhancing the vaporization of molecules comprising said species from the matrix.

Therefore one can adjust the partial pressure of the additional gas by the flow of additional gas injected in the plasma to ensure that only the desired species is being extracted from the matrix.

An example of partial pressure modulation is detailed in example 1.

In the case where oxygen is used as additional gas in the injected plasma in order to extract metallic species under the form of oxides, Ellingham diagram can be used to determine the adequate temperature as well as the adequate partial pressure of oxygen, to extract the desired species.

Figure 7:
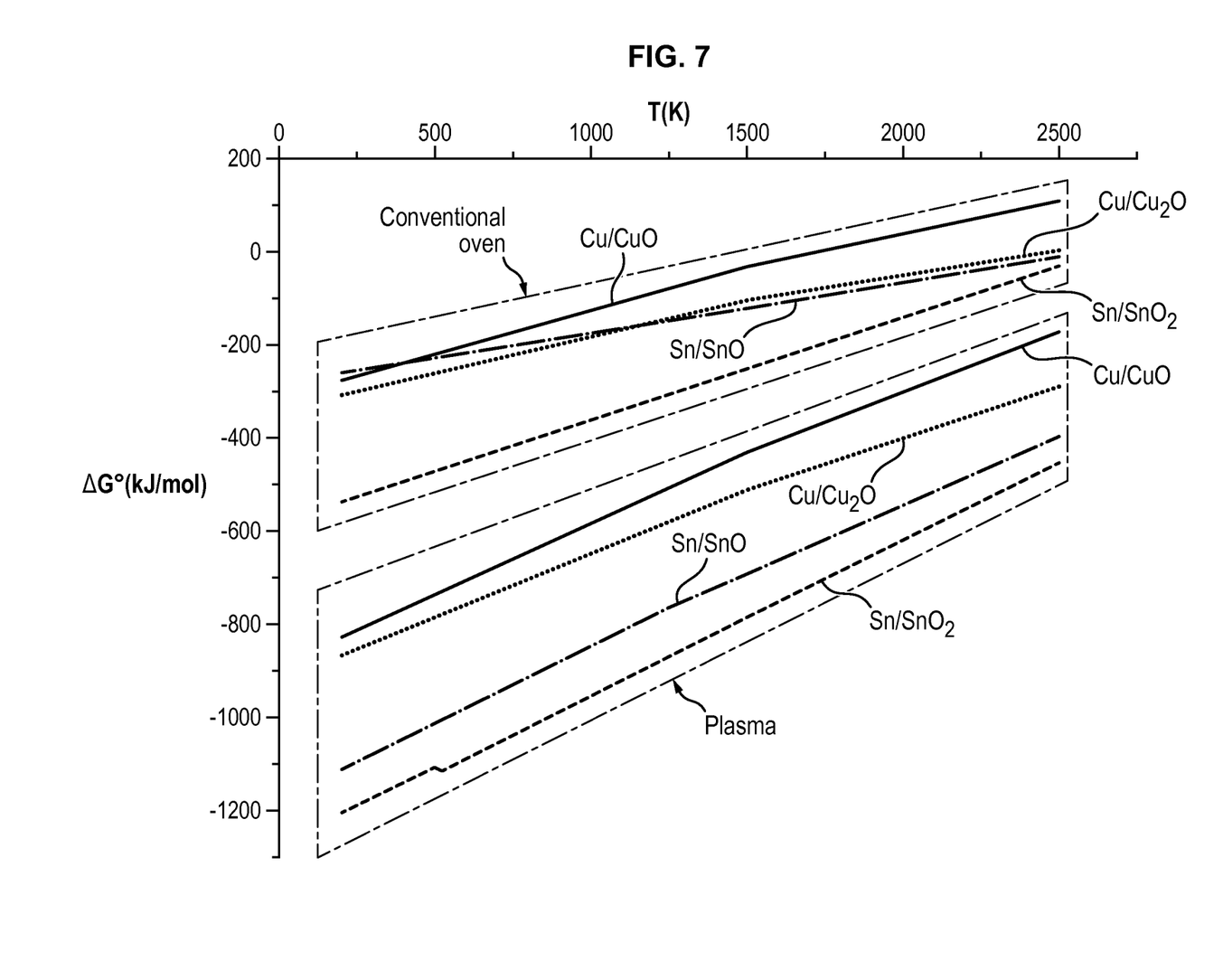
FIG. 7 shows a comparative Ellingham diagram of formation of tin and copper oxides, in a plasma medium or in a conventional oven.

Still in the case of oxygen used as additional gas, with reference to FIG. 7, Ellingham diagram also show that the use of plasma is particularly adapted to extraction of desired species from a matrix, instead of placing a matrix in a conventional oven comprising an atmosphere adapted according to the species to be extracted.

Indeed, in the atmosphere created by the plasma, the injected dioxygen is broken down into atoms of oxygen, therefore the energy required to break down dioxygen into atoms of oxygen is already provided by the plasma and is deduced from the energy required for the oxidation reaction which allows extraction of metallic species from the matrix. As clearly visible from FIG. 7, the plasma medium makes the oxidation reaction easier because it requires less energy than in a conventional oven, which increases the speed of reaction and therefore increases the rate of extraction of the species.

Potential Difference Between Plasma and Matrix

During step 300, the voltage or current generator can also be controlled to set the matrix at a desired potential via the matrix holder, which sets a potential difference between the matrix and the plasma. The plasma exhibits a natural bias of 80 V.

Applying a potential difference between the matrix and the plasma can enhance the diffusion of elements into the matrix, the vaporization of molecules at the interface and in turn increase the quantities of species collected out of the matrix.

The above description of the system 1 shows that these parameters can advantageously be adjusted without stopping the system, and in particular without stopping the plasma torch or removing the matrix. Indeed, the position of the matrix holder, the application of a potential to the matrix holder, and the management of the composition and pressures of the plasma producing gas and additional gas can be controlled by the control unit in real time without intervention of an operator.

Thus step 300 comprises adjustment of the above parameters while continuously maintaining injection of plasma within the extraction chamber 10 and monitoring the content of the atmosphere within the extraction chamber by optical emission spectroscopy.

The emission lines issued by atoms during a transition from an excited to a non-excited state allow detecting the chemical species that are extracted from a matrix. By adjusting the parameters until only the emission line corresponding to the desired species is visible by optical emission spectroscopy, it is possible to extract only the desired species.

Once only the desired species is being extracted from the matrix, the desired species can be collected on a collection plate 16. Preferably the process comprises a step 400 of providing a collection plate 16 within the extraction chamber 10, at a position suitable for collection of extracted species, once the parameters are adjusted to ensure that only the desired species is being extracted.

For instance, the collection plate 16 may be provided between the plasma injected by the plasma torch and the evacuation path of the content of the extraction chamber towards the atmosphere that is provided by the pressure regulation device, as shown schematically on FIG. 1. The fact that the pressure is maintained equal to atmospheric pressure by permanently allowing a fluid communication between the inside of the chamber 10 and the outside causes particles to move towards an outlet of the extraction chamber and meet a collection plate interposed therebetween.

The collection results from condensation in liquid or solid form, on the collection plate 16, of the molecules generated from the species extracted from the matrix and from the additional gas and evaporated from the matrix, these molecules being continuously broken down and reformed within the extraction chamber. Back to the example of FIG. 2, molecules of $Cu_2O$ evaporated from the matrix condensate on a collection plate 16.

As only the desired species is being extracted from the matrix in the form of these molecules, only the molecules generated from said species deposit on the collection plate 16. The desired species is therefore collected in its pure molecular form. For instance, if a species is deposited as an oxide on the collection plate, the plate then comprises pure oxide of this species (e.g.: copper oxide), and none other species (in particular metallic species) contained in the matrix.

Optionally, the collection plate 16 may be set at a determined potential to enhance deposition of the molecules.

After a first species has been extracted from the matrix, another desired species may be extracted from the same matrix. For instance, another species may be extracted from the matrix when the extraction of a first desired species from the matrix is terminated—possibly when the optical emission spectroscopy shows that the species is no longer extracted from the matrix, The matrix is thus kept in place in the same extraction chamber and the steps of plasma injection 310 and of continuous monitoring 320 keep on going, i.e. they are not interrupted between the extraction of the first and the second species. The parameters given above (distance between the matrix and the torch, plasma composition, etc.) are then adapted during a step 330 to the next species to be extracted until this species is visualized by OES. This species is then collected on a collection plate, which is preferably a distinct plate from the plate used for the previous species.

The process can thus be performed serially over a series of species to extract from a matrix, in order to recover all the desired species contained by the matrix, with a quick and easy adaptation.

For instance, a matrix originally composed of iron, tin and copper could be serially processed to first extract and recover the copper, and then to extract and recover tin, while always maintaining the matrix in the extraction chamber and continuously performing steps 310 and 320.

With reference to FIGS. 4a to 5b, two examples will be detailed, respectively of extraction of Tin and Copper from matrices.

EXAMPLE 1

Tin Sn was extracted from a matrix comprising 85% Cu and 15% Sn in weight. The plasma producing gas was argon.

Figure 4A:
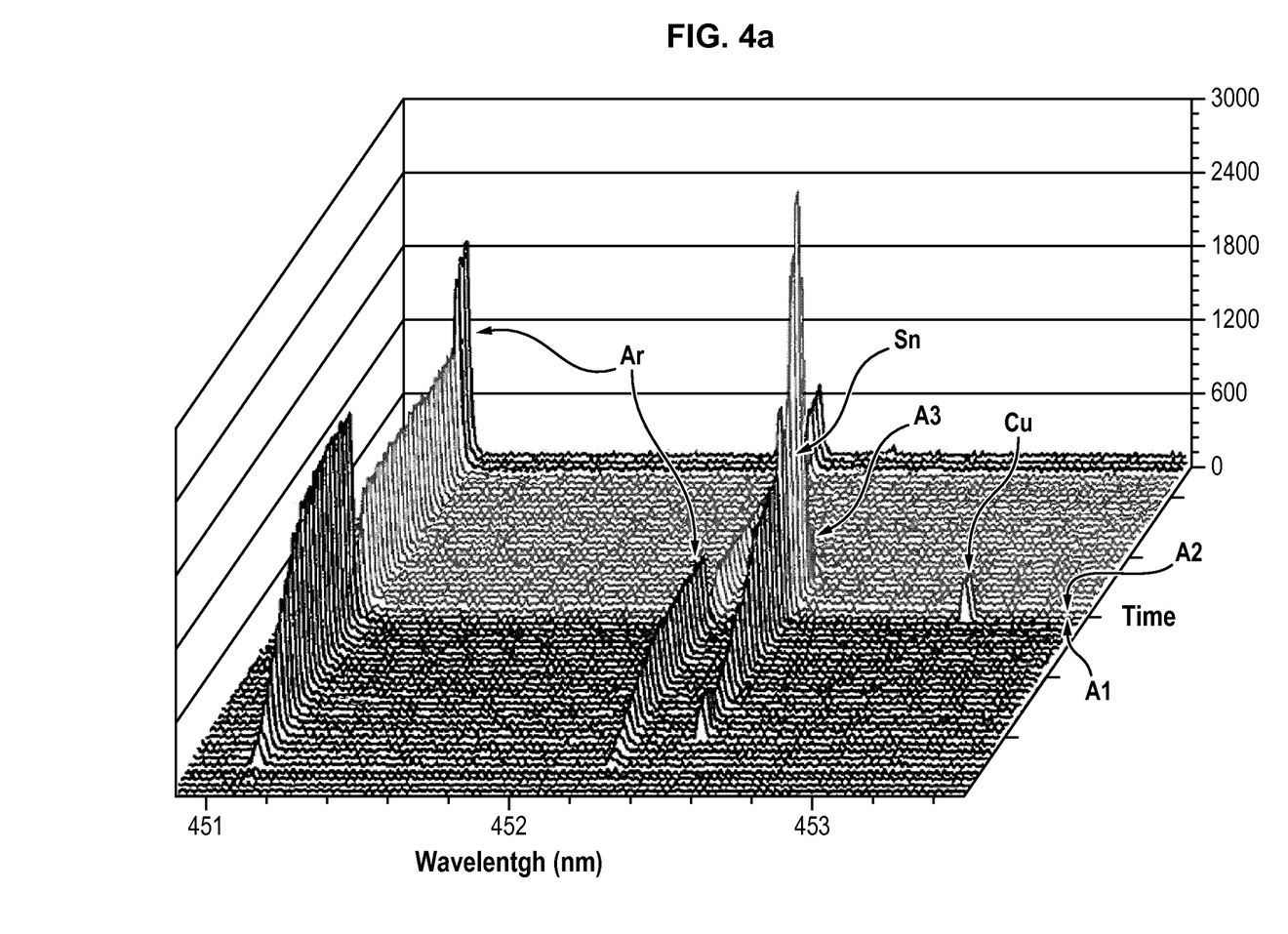
FIG. 4a shows an example of analysis by optical emission spectroscopy of the extraction of tin from a matrix.

FIG. 4a displays the continuous monitoring of the excited elements contained in the extraction chamber 10 while performing the following adjustments.

At the end of the start-up phase of the system, during which only argon is visible in the extraction chamber 10, oxygen was injected with a small partial pressure of 15 Pa to form the plasma as additional gas, the matrix was set at a potential of 95 V and the distance between the matrix and the torch was adjusted until extraction of tin from the matrix could be observed by OES (point A1 in FIG. 4a).

At this point one can observe that copper is also being extracted from the matrix.

Thus the partial pressures of argon and oxygen where adjusted to increase the selectivity of the process and ensure that only tin was extracted from the matrix. The setting of the partial pressures of argon and oxygen to respectively $P_{Argon}=99530$ Pa and $P_{Oxygen}=470$ Pa provokes an immediate cancellation of the extraction of copper and an increase in extraction of tin (point A2).

The parameters are then set back to their initial conditions by increasing the distance between the matrix and the plasma torch and suppressing the injection of oxygen as additional gas in the plasma. This results in the cancellation of extraction of tin from the matrix (point A3).

A collection plate made of silicon was used to collect tin extracted from the matrix at the time when no emission line of copper was visible by the OES. Tin was deposited on only part of the surface of the plate.

Figure 4B:
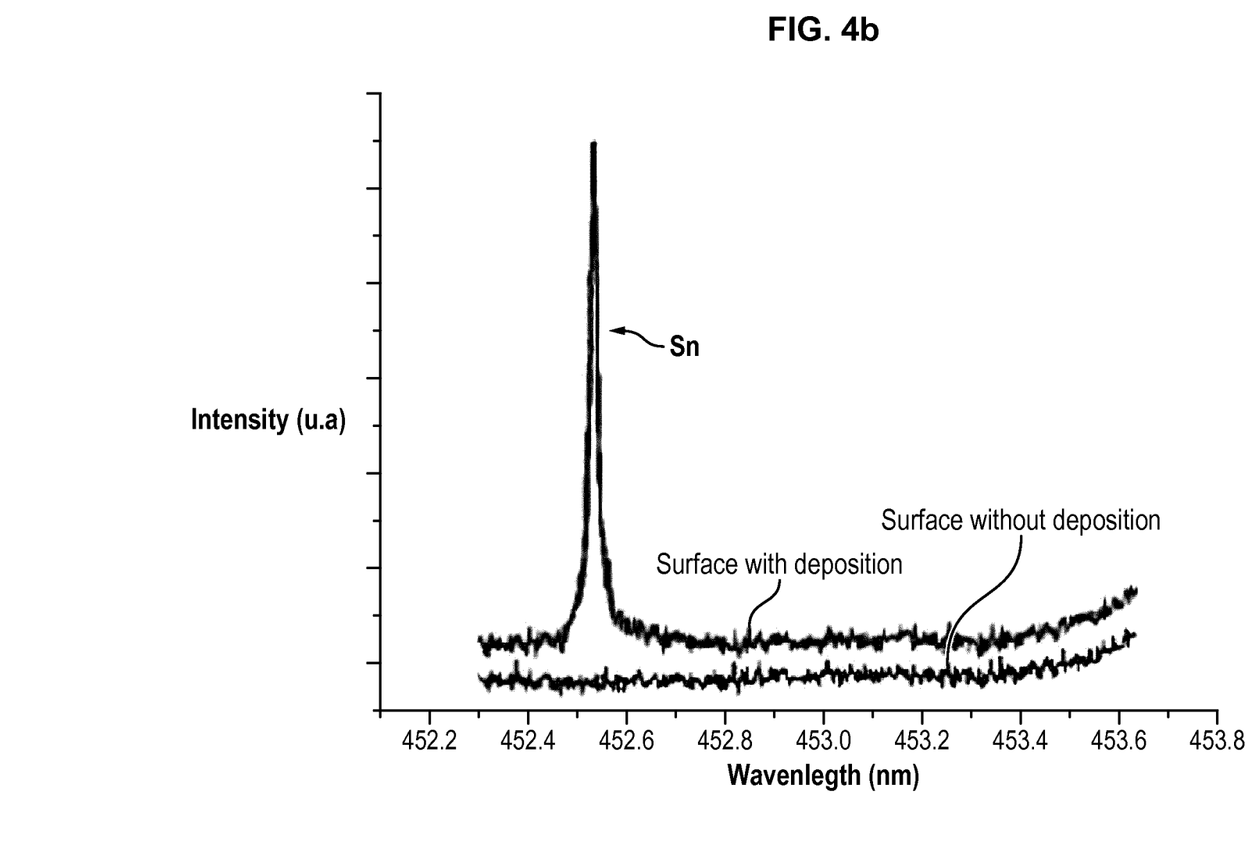
FIG. 4b shows a LIBS analysis of the collection plate used during the extraction of tin.

The collection plate was later analysed by Laser-induced Breakdown Spectroscopy (LIBS), with the results displayed in FIG. 4b. A first curve shows the analysis of the surface of the plate on which tin deposited, and a second curve shows the analysis of the surface of the plate devoid of any deposition.

The results of the LIBS analysis show that on the deposition surface only Tin was collected and no copper impurity was deposited. The $SnO_2$ composition was confirmed by X-Ray Diffraction analysis.

EXAMPLE 2

Copper Cu was extracted from a matrix comprising 75% iron Fe and 25% copper Cu in weight. The plasma producing gas was argon.

Figure 5A:
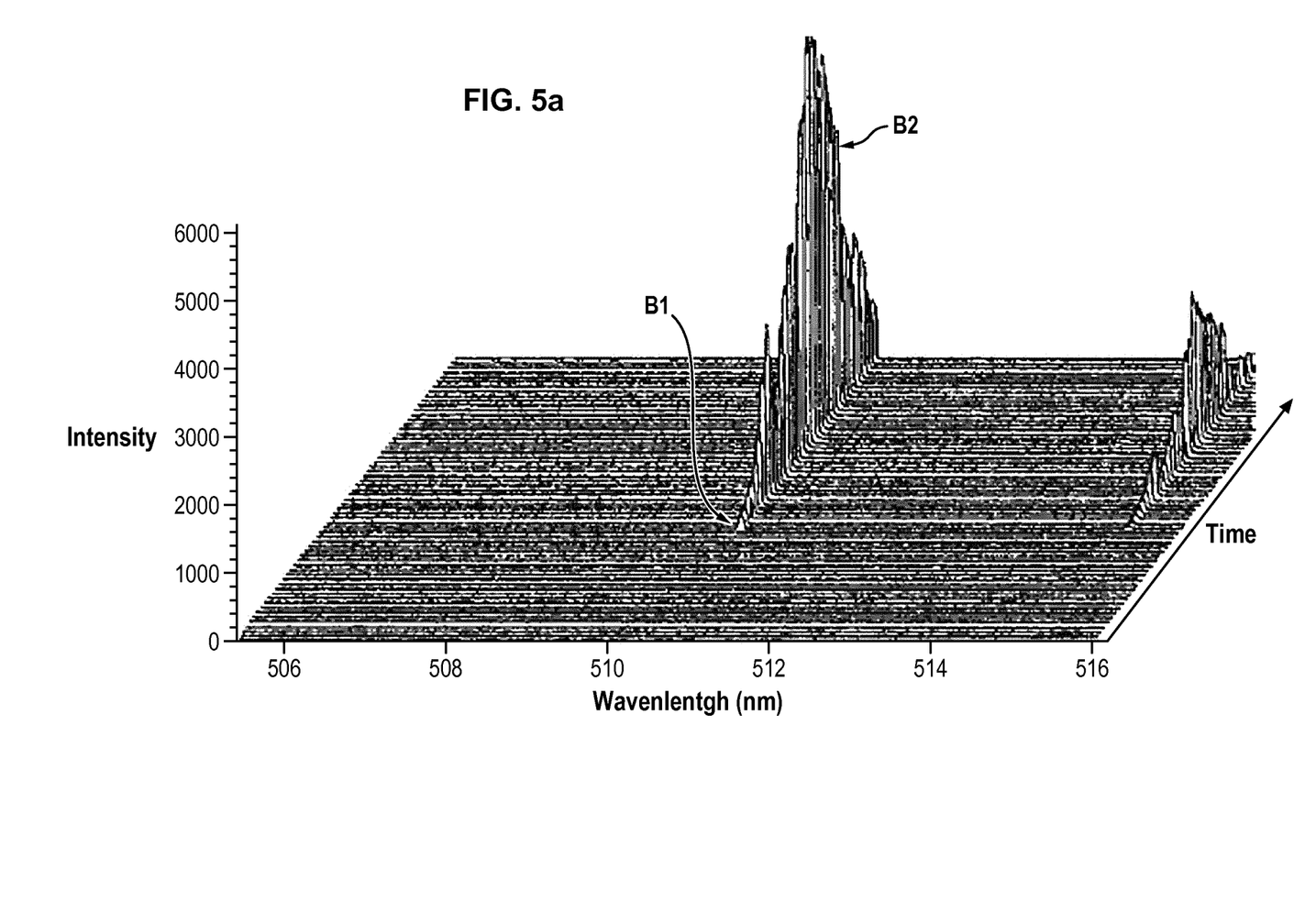
FIG. 5a shows an example of analysis by optical emission spectroscopy of the extraction of copper from a matrix.

FIG. 5a displays the continuous monitoring of the excited elements contained in the extraction chamber 10 while performing the following adjustments.

Once the system was started and stabilized and the matrix was in place within the extraction chamber, the partial pressures of argon as plasma producing gas and oxygen as additional gas were set to respectively $P_{Argon}$=99600 Pa and $P_{Oxygen}$=400 Pa, the matrix was set at a potential of 105 V and the distance between the matrix and the plasma torch 30 was adjusted until extraction of copper from the matrix could be observed by OES (point B1 on FIG. 5a).

FIG. 5a shows the two emission lines of copper and confirms that no iron was extracted from the matrix.

Afterwards the injection of oxygen is stopped (the partial pressure of oxygen is set back to $P_{Oxygen}$=0 Pa) and no potential is applied on the matrix. From that moment on (point B2 on FIG. 5b), the amount of copper extracted from the matrix diminishes until no copper at all is extracted from the matrix.

The extracted copper was deposited on part of the surface of an alumina plate. The collection plate was then analysed by LIBS, with the results displayed in FIG. 5b. A first curve shows the analysis of the surface of the plate on which copper deposited, and a second curve shows the analysis of the surface of the plate devoid of any deposition.

Figure 5B:
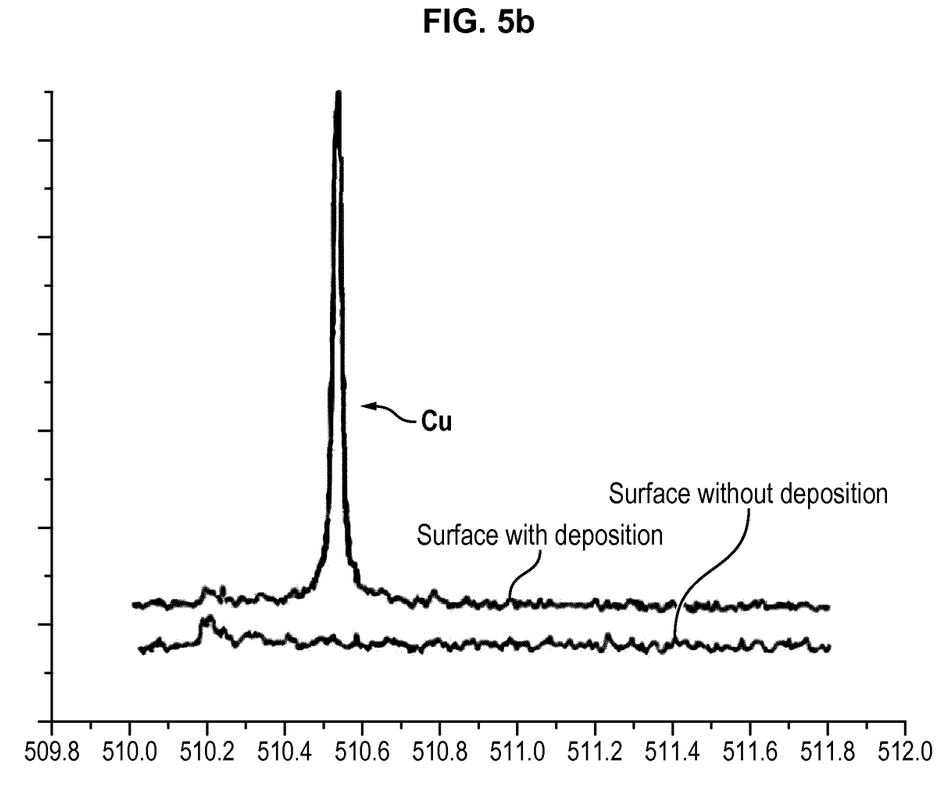
FIG. 5b shows a LIBS analysis of the collection plate used during the extraction of copper.

The results of the LIBS analysis show that on the deposition surface only copper was collected. The $Cu_2O$ composition was confirmed by X-Ray Diffraction analysis.

Therefore this process allows extracting only desired species from a base matrix and collecting said species devoid of any impurity.

Furthermore it is possible to sequentially extract a series of desired species from a common matrix, by sequentially adjusting the above parameters to each new species to collect.

More specifically, the sequence of steps 330 and 400 can be implemented serially for each species to extract, while always maintaining the matrix in the extraction chamber and performing the steps 310 and 320, which means that the adaptation of the process to each new species to extract is quick and easy.

The process can thus be performed serially for a series of species to be extracted, with only an adjustment of the parameters and, preferably, an insertion of a new collection plate for each new species to extract. It is therefore not necessary to adapt the design of the system according to the type of matrix to process or the type of species to extract.

Moreover, this process can also be implemented as a test for determining the composition of a matrix, by sequentially adjusting the parameters at step 330 while always monitoring the composition of the plasma by OES to list the species contained in the matrix.

Last, the use of a plasma torch allows extracting the desired species at an higher rate compared to extraction in conventional ovens.

The invention claimed is:

1. A process for extracting a species of a plurality of species from a matrix, comprising:
  injecting a plasma into an extraction chamber by a plasma torch, wherein the plasma is formed from a plasma generating gas and an additional gas, the additional gas having a composition selected to react with a chemical composition of the species to be extracted from the matrix;
  reacting atoms of the additional gas of the plasma with the species to be extracted to form molecules at a surface of the matrix such that the species is vaporized and extracted from the matrix, the matrix disposed on a moveable support within the extraction chamber;
  continuously monitoring a composition of excited elements of the vaporized species extracted from the matrix and contained in the plasma by optical emission spectroscopy;
  setting a distance between the moveable support and the plasma torch to achieve a predetermined temperature at an interface between the matrix and the plasma, wherein the predetermined temperature is a function of the species to be extracted from the matrix;
  setting the matrix at a determined potential related to the plasma and adjusting the potential according to the monitored excited elements; and
  collecting on a plate, exterior to the plasma, the molecules of the species extracted from the matrix.

2. The process according to claim 1, wherein setting the distance between the support and the plasma torch comprises moving the support relative to the plasma torch.

3. The process according to claim 1, wherein the additional gas is selected among the group consisting of oxygen, hydrogen, nitrogen, ammonia gas, chlorine, fluorine, carbon dioxide and their derivatives including nitrates and hydrocarbines.

4. The process according to claim 1, wherein the matrix is a piece of electronic waste.

5. The process according to claim 1, further comprising adjusting a flow of the additional gas forming the injected plasma, to adjust a partial pressure of the additional gas inside the extraction chamber, according to the monitored excited elements.

6. The process according to claim 1, further comprising, prior to injecting the plasma into the extraction chamber, performing a pyrolysis of the matrix with a plasma comprising the plasma-producing gas and lacking the additional gas.

7. The process according to claim 6, further comprising monitoring the plasma comprising the plasma-producing gas and lacking the additional gas by optical emission spectroscopy to detect stabilization of the plasma, before introducing the matrix in the extraction chamber or adjusting the distance between the substrate and the plasma torch.

8. The process according to claim 7, wherein the plasma-producing gas comprises argon, and wherein detecting the stabilization of the plasma comprises detecting a stabilization of the amount of argon in the plasma by optical emission spectroscopy.

9. The process according to claim 1, further comprising setting the collection plate at a determined potential according to the species extracted to enhance deposition of the molecules of the species extracted from the matrix on the collection plate.

10. The process according to claim 1, wherein the extracted species is a metallic species.

11. The process according to claim 1, further comprising feeding the matrix continuously under powder form into the extraction chamber or sequentially as a batch into the extraction chamber.

12. A recycling process, comprising extracting at least two species of the plurality of species in a matrix by implementation of the process according claim 1, wherein the matrix is a piece of electronic waste.

13. A system for selective extraction of species from a matrix, comprising:
- an extraction chamber,
- a support located within the extraction chamber,
- a plasma torch comprising a supply of plasma-producing gas, a supply of at least one additive gas, and a gas mixing device, the plasma torch being configured for generating a plasma directed towards the support,
- an optical emission spectroscopy apparatus configured to continuously monitor excited elements contained within the extraction chamber,
- a control unit operatively coupled to the support and the plasma torch, the control unit configured to:
  - determine and modify a distance between the support and the plasma torch to achieve a predetermined temperature at an interface between the matrix and the plasma, wherein the predetermined temperature is a function of the species to be extracted from the matrix; and
  - modify a composition of the at least one of the plasma-producing gas and the at least one additive gas as a function of a composition of the monitored excited elements such that the species of the plurality of species in the matrix is extracted;
- wherein the support is movable with respect to the plasma torch to change the distance between the support and the plasma torch during the injection of the plasma;
- a power source configured to set the matrix disposed on the support at a determined potential; and
- an RF filter interposed between the power source and the matrix.

14. The system according to claim 13, further comprising a collection plate located within the extraction chamber and configured for deposition of the single species extracted from the matrix thereon.

* * * * *